United States Patent
Shin et al.

(10) Patent No.: US 9,562,999 B2
(45) Date of Patent: Feb. 7, 2017

(54) OPTICAL FILM COMPRISING FIRST AND SECOND SEMI-TRANSMISSIVE FILMS CONFIGURED TO TRANSMIT A LINEARLY POLARIZED LIGHT COMPONENT AND REFLECT A CIRCULARLY POLARIZED LIGHT COMPONENT AND DISPLAY APPARATUS INCLUDING THE OPTICAL FILM

(71) Applicant: Samsung Display Co., Ltd., Yongin, Gyeonggi-Do (KR)

(72) Inventors: NaYoung Shin, Hwaseong-si (KR); Ji-Hoon Kim, Hwaseong-si (KR); Beong-hun Beon, Hwaseongsi (KR); Sang-Gu Lee, Hwaseong-si (KR); Daewon Kim, Suwon-si (KR); Minsu Kim, Hwaseong-si (KR); Seungbeom Park, Hwaseong-si (KR); Jung-Hun Lee, Seoul (KR); Yun Jang, Hwaseong-si (KR); Kyunghwan Jeon, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 180 days.

(21) Appl. No.: 14/279,076

(22) Filed: May 15, 2014

(65) Prior Publication Data
US 2015/0116648 A1 Apr. 30, 2015

(30) Foreign Application Priority Data
Oct. 30, 2013 (KR) ........................ 10-2013-0130460

(51) Int. Cl.
*G02B 5/30* (2006.01)
*G02B 5/02* (2006.01)

(52) U.S. Cl.
CPC ........... *G02B 5/3016* (2013.01); *G02B 5/0242* (2013.01); *G02B 5/3033* (2013.01)

(58) Field of Classification Search
CPC .................... G02B 5/2042; G02B 5/02; G02F 2001/133531; G02F 2001/133541; G01R 33/3678
See application file for complete search history.

(56) References Cited

U.S. PATENT DOCUMENTS

2002/0113923 A1 8/2002 Kashima et al.
2007/0085950 A1* 4/2007 Hu ....................... G02B 6/0056
349/115

(Continued)

FOREIGN PATENT DOCUMENTS

JP 2004-233666 8/2004
KR 10-2003-0077813 10/2003

(Continued)

*Primary Examiner* — Paul Lee
(74) *Attorney, Agent, or Firm* — Innovation Counsel LLP

(57) ABSTRACT

An optical film may include a polarizer configured to linearly polarize a first light to provide a linearly polarized light component. The optical film may further include a first semi-transmissive film overlapping the polarizer, configured to transmit the linearly polarized light component, and configured to reflect a first circularly polarized component of a second light. The first circularly polarized component of the second light may have a first wavelength. The optical film may further include a second semi-transmissive film overlapping the first semi-transmissive film, configured to transmit the linearly polarized light component, and configured to reflect a second circularly polarized component of the second light. The second circularly polarized component of the second light may have a second wavelength that is unequal to the first wavelength.

20 Claims, 6 Drawing Sheets

(56) References Cited

U.S. PATENT DOCUMENTS

2009/0231713 A1 9/2009 Takada
2011/0234948 A1* 9/2011 Yoon .......................... C09J 4/06
                                                             349/96
2011/0279749 A1* 11/2011 Erinjippurath ....... G09G 3/3426
                                                             349/61

FOREIGN PATENT DOCUMENTS

KR         10-1080050        11/2011
KR    10-2013-0039211         4/2013
KR         10-1251403         4/2013

* cited by examiner

OPTICAL FILM COMPRISING FIRST AND SECOND SEMI-TRANSMISSIVE FILMS CONFIGURED TO TRANSMIT A LINEARLY POLARIZED LIGHT COMPONENT AND REFLECT A CIRCULARLY POLARIZED LIGHT COMPONENT AND DISPLAY APPARATUS INCLUDING THE OPTICAL FILM

CROSS-REFERENCE TO RELATED APPLICATION

This U.S. non-provisional patent application claims priority under 35 U.S.C. §119 to and benefit of Korean Patent Application No. 10-2013-0130460, filed on Oct. 30, 2013, which is incorporated herein by reference.

BACKGROUND

1. Field of the Invention

The present invention is related to an optical film and a display apparatus that includes the optical film.

2. Description of the Related Art

Display apparatuses are widely used for displaying images. When a display apparatus is displaying an image, a user may point at a specific portion of the image using a light source, e.g., a laser point, to direct the attention of others to the pointed portion of the image. The light irradiated to the portion of the image may be reflected by a surface of the display apparatus, and the reflected light may reach the others such that the others may pay attention to the portion of the image pointed out by the user.

SUMMARY

Embodiments of the present invention may be related to an optical film having desirable optical property and may be related to a display apparatus that includes the optical film.

Embodiments of the present invention may be related to an optical film that may include a polarizer configured to linearly polarize the first light to provide a linearly polarized light component, a first semi-transmissive film overlapping the polarizer, configured to transmit the linearly polarized light component, and configured to reflect a first circularly polarized component of a second light, the first circularly polarized component of the second light having a first wavelength, and a second semi-transmissive film overlapping the first semi-transmissive film, configured to transmit the linearly polarized light component, and configured to reflect a second circularly polarized component of the second light, the second circularly polarized component of the second light having a second wavelength that is unequal to the first wavelength.

Embodiments of the present invention may be related to a display apparatus that may include a display panel configured to output a first light that is associated with an image, a polarizer overlapping the display panel and configured to linearly polarize the first light to provide a linearly polarized light component, a first semi-transmissive film overlapping the polarizer, configured to transmit the linearly polarized light component, and configured to reflect a first circularly polarized component of a second light, the first circularly polarized component of the second light having a first wavelength; and a second semi-transmissive film overlapping the first semi-transmissive film, configured to transmit the linearly polarized light component, and configured to reflect a second circularly polarized component of the second light, the second circularly polarized component of the second light having a second wavelength that is unequal to the first wavelength, and the polarizer is disposed between the display panel and the first semi-transmissive film.

According to embodiments of the invention, an optical film may reflect a substantial portion of a laser beam when the laser beam is irradiated onto the optical film by a laser pointer and may effectively transmit images. Advantageously, desirable visibility of both the position indicated by the laser beam and the image may be provided.

DETAILED DESCRIPTION

Figure 1:
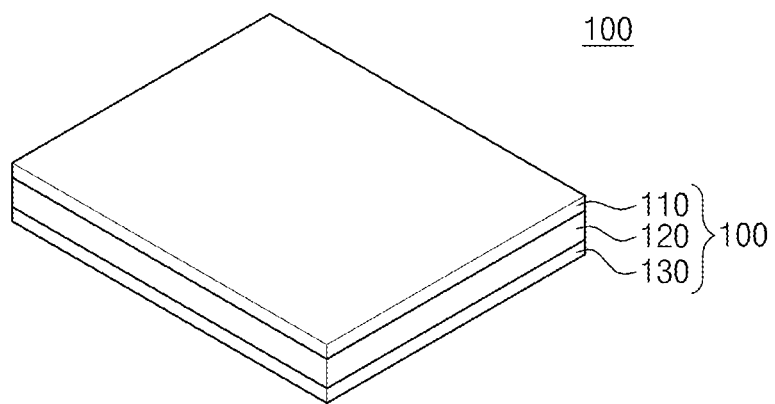
FIG. 1 is a perspective view illustrating an optical film according to an embodiment of the present invention.

In this application, if an element or layer is referred to as being "on", "connected to", or "coupled to" another element or layer, it can be directly on, directly connected to, or directly coupled to the other element or layer, or one or more intervening elements or layers may be present. If an element is referred to as being "directly on", "directly connected to", or "directly coupled to" another element or layer, there are no (intended) intervening elements or layers (except environmental elements such as air) present. Like numbers may refer to like elements. The term "and/or" may include any and all combinations of one or more of the associated items.

Although the terms "first", "second", etc. may be used herein to describe various elements, these elements should not be limited by these terms. These terms may be used to distinguish one element from another element. Thus, a first element discussed below could be termed a second element without departing from the teachings of the present invention. The description of an element as a "first" element may not require or imply the presence of a second element or other elements. The terms "first", "second", etc. may also be used herein to differentiate different categories of elements. For conciseness, the terms "first", "second", etc. may represent "first-type (or first-category)", "second-type (or second-category)", etc., respectively.

Spatially relative terms, such as "beneath", "below", "lower", "above", "upper", and the like, may be used herein for describing relationship of elements illustrated in the figures. The spatially relative terms may encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both "above" and "below". The device may be oriented in other manners (e.g., rotated 90 degrees or disposed at other orientations), and the spatially relative descriptors used herein should be interpreted accordingly.

The terminology used herein is for describing particular embodiments and should not limit the invention. The singular forms, "a", "an", and "the" may include plural forms as well, unless the context clearly indicates otherwise. The terms "includes" and/or "including" specify the presence of stated features, integers, steps, operations, elements, and/or components, but do not preclude the presence or addition of one or more other features, integers, steps, operations, elements, components, and/or groups.

Unless otherwise defined, terms (including technical and scientific terms) used herein have the same meanings as commonly understood by one of ordinary skill in the art related to the field of this invention. Terms, such as those defined in commonly used dictionaries, should be interpreted as having meanings that are consistent with their meanings in the context of the relevant art and should not be interpreted in an idealized or overly formal sense unless expressly so defined.

FIG. 1 is a perspective view illustrating an optical film 100 according to an embodiment of the present invention.

Referring to FIG. 1, the optical film 100 includes an anti-glare film 110, one or more semi-transmissive films 120, and a polarizing plate 130. The polarizing plate 130, the semi-transmissive films 120, and the anti-glare film 110 are sequentially stacked such that the semi-transmissive films 120 are disposed between the polarizing plate 130 and the anti-glare film 110. In an embodiment, the semi-transmissive films 120 may completely overlap and directly contact one entire surface of the polarizing plate 130, and the anti-glare film 110 may completely overlap and directly contact one entire surface of the semi-transmissive films 120. An upper surface of the anti-glare film 110 illustrated in the figures may be referred to as a front surface of the optical film 100, and a lower surface of the polarizing plate 130 opposite the upper surface of the anti-glare film 110 may be referred to as a rear surface of the optical film 100.

Figure 2:
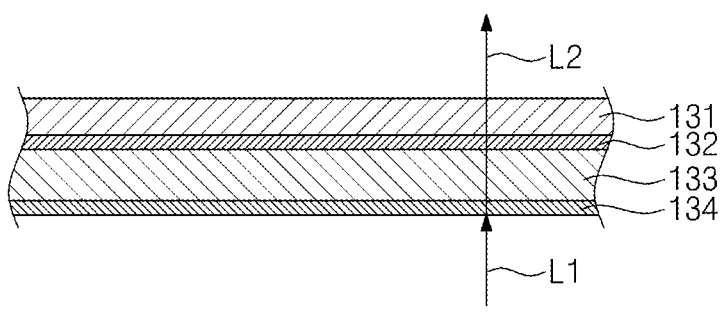
FIG. 2 is a cross-sectional view illustrating a polarizing plate illustrated in FIG. 1.

FIG. 2 is a cross-sectional view illustrating the polarizing plate 130 illustrated in FIG. 1.

Referring to FIG. 2, the polarizing plate 130 may transmit only light components polarized in one or more specific directions and may absorb or reflect light components polarized in other directions. The polarizing plate 130 may linearly polarize light in a specific direction. In an embodiment, if a non-polarized first light L1 is incident to the lower surface of the polarizing plate 130, the polarizing plate 130 may transmit light components of the first light L1 that vibrate in a first direction D1 and may absorb or reflect light components of the first light L1 that vibrate in directions different from the first direction D1; accordingly, the polarizing plate 130 may linearly polarize the first light L1 to output a second light L2. A so-called "non-polarized light" may be a light obtained by overlapping a linearly-polarized light component with a circularly-polarized light component, wherein the circularly-polarized light component may include a left-circularly polarized light component and a right-circularly polarized light component. The first direction D1 may be substantially parallel to the lower surface and/or upper surface of the polarizing plate 130.

The polarizing plate 130 includes a protective member 131, a first support member 132, a second support member 134, and a polarizing film 133 disposed between the support members 132 and 134. The protective member 131 may prevent the polarizing film 133 from being contaminated and damaged. The protective member 131 may include a material that may be optically transparent, may not cause substantial birefringence, and may have high mechanical strength. The protective member 131 may include one or more of a biaxially-elongated polyolefin film, a polyester film, a thermoplastic norbornene-based resin film, a polycarbonate film, and a polybutylene terephthalate film, and a combination of some of these films. In an embodiment, the semi-transmissive films 120 may be disposed on and/or may directly contact the protective member 131.

The polarizing film 133 may be formed using this process: after allowing dichroic iodine or dichroic dye to be adsorbed onto a polyvinyl alcohol resin film, drawing the resin film in an elongation direction. The polarizing film 133 may absorb light components vibrating in the elongation direction and may transmit light components vibrating in a direction substantially perpendicular to the elongation direction. Therefore, the polarizing film 133 may linearly polarizes incident light in a specific predetermined direction.

The support members 132 and 134 are respectively disposed on upper and lower surfaces of the polarizing film 133 to support the polarizing film 133. The support members 132 and 134 may be formed of a cellulose-based polymer, e.g., tri-acetate cellulose (TAC).

Figure 3:
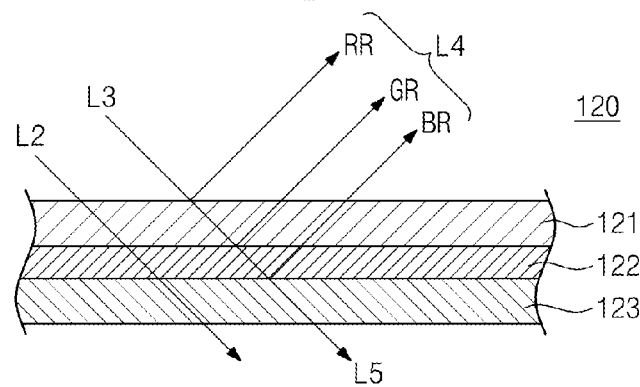
FIG. 3 is a cross-sectional view illustrating a plurality of semi-transmissive films illustrated in FIG. 1.

FIG. 3 is a cross-sectional view illustrating the semi-transmissive films 120 illustrated in FIG. 1.

Referring to FIG. 3, the semi-transmissive films 120 may transmit light components circularly-polarized in a predetermined direction and may absorb or reflect light components circularly-polarized in a direction different from the predetermined direction or and may absorb or reflect light components linearly-polarized in a direction different from the predetermined direction. In an embodiment, if a non-polarized third light L3 is incident to an upper surface of the semi-transmissive films 120, a right-circularly polarized fourth light L4 in the third light L3 may be reflected, and a fifth light L5 having the left-circularly polarized light components consistent with the predetermined direction and the linearly-polarized light components in the third light L3 may be transmitted through the semi-transmissive films 120.

The semi-transmissive films 120 may include semi-transmissive films 121, 122, and 123. The first semi-transmissive film 121 is disposed on the second semi-transmissive film 122, and the second semi-transmissive film 122 is disposed on the third semi-transmissive film 123.

The semi-transmissive films 121, 122, and 123 may be sequentially stacked, such that the second semi-transmissive film 122 may be disposed between the first semi-transmissive film 121 and the third semi-transmissive film 123. The semi-transmissive films 121, 122, 123 may be arranged in one or more other orders and/or configurations.

Each of the semi-transmissive films 121, 122, 123 may reflect left-circularly polarized light components or right-circularly polarized light components. The first semi-transmissive film 121 may reflect light components having wavelengths in a first wavelength range. The second semi-transmissive film 122 may reflect light components having wavelengths in a second wavelength range. The third semi-transmissive film 123 may reflect light components having wavelengths in a third wavelength range. The first wavelength range, the second wavelength range, and the third wavelength range may be different from each other.

The third light L3 may include lights having components in various wavelength ranges. For instance, the third light L3 may include red, green, and blue light components.

The first semi-transmissive film 121 may reflect a left-circularly polarized red light component or a right-circularly polarized red light component of the third light L3. In an embodiment, the first semi-transmissive film 121 may reflect the right-circularly polarized red light component RR of the third light L3. The first semi-transmissive film 121 may transmit a linearly-polarized light component, the left-circularly polarized light component, and the right-circularly polarized non-red light component of the third light L3.

Analogously, the second semi-transmissive film 122 may reflect a right-circularly polarized green light component GR of the third light L3, and the third semi-transmissive film 123 may reflect a right-circularly polarized blue light component BR of the third light L3.

Figure 4:
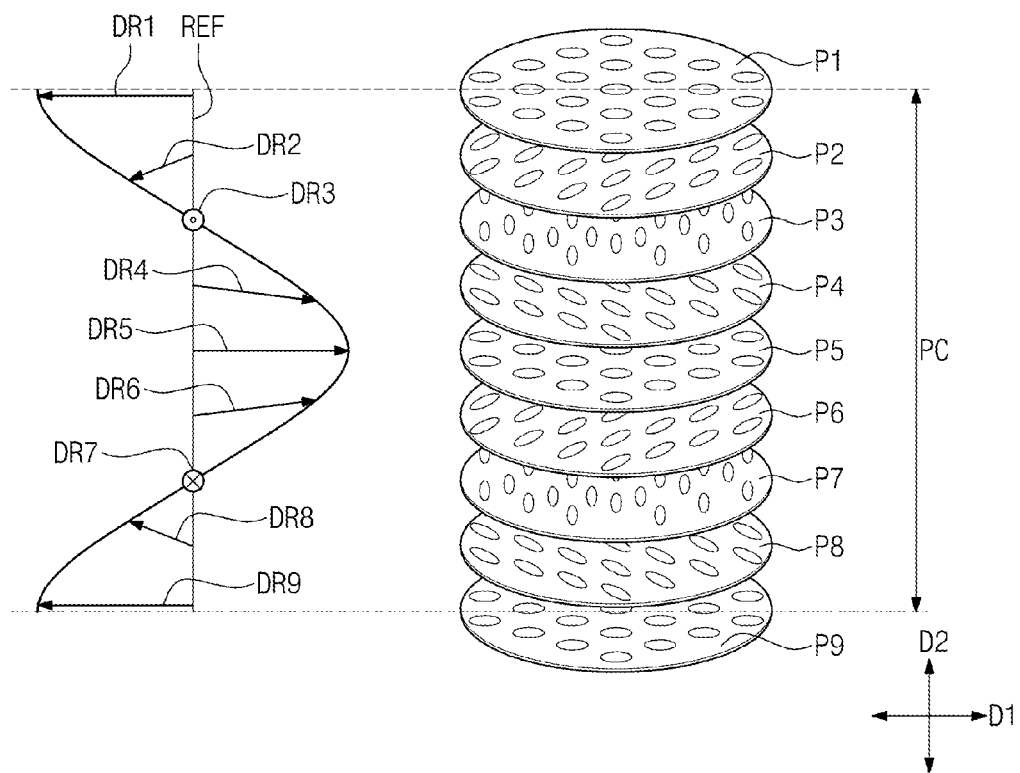
FIG. 4 shows a perspective view (e.g., an enlarged perspective view) illustrating first cholesteric liquid crystal molecules.

The first semi-transmissive film 121 may include first cholesteric liquid crystal layers (or first-group cholesteric liquid crystal layers). The first cholesteric liquid crystal layers may include first cholesteric liquid crystal molecules (or first-group cholesteric liquid crystal molecules) and chiral dopants (not shown) configured to align the first cholesteric liquid crystal molecules in specific directions. Analogously, the second semi-transmissive film 122 and the third semi-transmissive film 123 may include respective cholesteric liquid crystal layers. FIG. 4 shows a perspective view (e.g., an enlarged perspective view) illustrating the first cholesteric liquid crystal molecules included in the first semi-transmissive film 121.

Referring to FIG. 4, the first cholesteric liquid crystal molecules are arranged in the first cholesteric liquid crystal layers, and the first cholesteric liquid crystal molecules arranged in the same layer are aligned (and/or oriented) in the same direction. The alignment directions of the first cholesteric liquid crystal molecules in the layers may be referred to as directors. The directors of the layers are arranged in a spiral shape (or configuration) along a second direction D2 corresponding to a thickness direction of the first cholesteric liquid crystal layers, i.e., a thickness direction of the first semi-transmissive film 121. The second direction D2 is substantially vertical to the first direction D1, which may be parallel to a bottom surface of the first semi-transmissive film 121. The chiral dopants may align the first cholesteric liquid crystal molecules to be oriented in the spiral shape.

In an embodiment, the first cholesteric liquid crystal layers may include nine layers, i.e., layers P1 to P9, sequentially stacked along the second direction D2. Alignment directions of the first cholesteric liquid crystal molecules of the nine layers P1 to P9 correspond to nine directors DR1 to DR9, respectively.

In an embodiment, the first cholestric liquid crystal has a right circular pitch in which each of the directors DR2 to DR9 may appear to be rotated from the director immediately above in a counter-clockwise direction about a reference line REF extending the second direction D2 in a plan view of the first semi-transmissive film 121 (viewed from the point of view of a light source or a user). For example, the second director DR2 may appear to be rotated from the first director D1 about the reference line REF in the plan view, the third director DR3 may appear to be rotated from the second director D2 about the reference line REF in the plan view, etc. In an embodiment, the first director DR1 may indicate a left direction with respect to the reference line REF, the third director DR3 may indicate a direction that comes out from the page with respect to the reference line REF, and the second director DR2 may indicate a direction corresponding to a vector sum of the directors DR1 and DR3. The fifth director DR5 may indicate a right direction with respect to the reference line REF, and the fourth director DR4 may indicate a direction corresponding to a vector sum of the directors DR3 and DR5. The seventh director DR7 may indicate a direction that penetrates into the page with respect to the reference line REF, and the sixth director DR6 may indicate a direction corresponding to a vector sum of the directions DR5 and DR7. The ninth director DR9 may indicate the left direction with respect to the reference line REF, and the eighth director DR8 may indicate a direction corresponding to a vector sum of the directors DR7 and DR9.

The first cholesteric liquid crystal layers may have a first pitch PC. The first pitch PC indicates a period in which the alignment of the first cholesteric liquid crystal molecules is repeated in the second direction D2. Since DR9 indicates the left direction indicated by DR1, the pitch PC may be an interval in the second direction D2 defined by the first layer P1 and the ninth layer P9, a distance between the center of the first layer P1 and the center of the ninth layer P9, a distance between a surface (e.g., upper surface or lower surface) of the first layer P1 and the corresponding surface (e.g., upper surface or lower surface) of the ninth layer P9.

The first pitch PC may be configured for reflecting a red light. In an embodiment, the first pitch PC may correspond to (e.g., be equal to) a wavelength of the red light. In an embodiment, since a spectrum of the red light has a peak located at about 780 nm, the first pitch PC may be about 780 nm.

In an embodiment, the first pitch PC may be larger than about 780 nm divided by n1, i.e., (780 nm/n1), and may be smaller than about 780 nm divided by n2, i.e., (780 nm/n2), wherein n1 denotes a refractive index of the first cholesteric liquid crystal molecules in a long axis of the first cholesteric liquid crystal molecules, and wherein n2 denotes a refractive index of the first cholesteric liquid crystal molecules in a short axis of the first cholesteric liquid crystal molecules.

In an embodiment, since the first cholesteric liquid crystal layers have the first pitch corresponding to the wavelength of the red light, and since the directors DR1 to DR9 have the above-described spiral configuration with aright circular pitch, the first semi-transmissive film 121 may reflect only the right-circularly polarized red light component RR of the third light L3.

Referring to FIG. 3 again, the second semi-transmissive film 122 may reflect a left-circularly polarized green light component or a right-circularly polarized green light component of the third light L3. In an embodiment, the second semi-transmissive film 122 may reflect the right-circularly polarized green light component GR of the third light L3. Thus, the second semi-transmissive film 122 may transmit a linearly-polarized light component, the left-circularly polarized light component, and the right-circularly polarized non-green light component of the third light L3.

The second semi-transmissive film 122 may include second cholesteric liquid crystal layers (or second-group cholesteric liquid crystal layers analogous to the first-group cholesteric liquid crystal layers illustrated in FIG. 4). The second cholesteric liquid crystal layers may include second cholesteric liquid crystal molecules (or second-group cholesteric liquid crystal molecules) and chiral dopants (not shown) configured to align the second cholesteric liquid crystal molecules in specific directions.

In an embodiment, analogous to the first cholesteric liquid crystal layers, the second cholesteric liquid crystal layers may be represented by directors arranged in a spiral configuration with a right circular pitch. The alignment structure of the second cholesteric liquid crystal molecules may be substantially identical to or analogous to that of the first cholesteric liquid crystal molecules except for a second pitch of the second cholesteric liquid crystal layers in the second direction D2. The second pitch indicates an interval in which the alignment of the second cholesteric liquid crystal molecules is repeated in the second direction D2.

The second pitch may be configured for reflecting a green light. In an embodiment, the second pitch may correspond to (e.g., be equal to) a wavelength of the green light. In an embodiment, since a spectrum of the green light has a peak located at about 600 nm, the second pitch may be about 600 nm.

In an embodiment, the second pitch may be larger than about 600 nm divided by n3, i.e., (600 nm/n3), and may be smaller than about 600 nm divided by n4, i.e., (600 nm/n4), wherein n3 denotes a refractive index of the second cholesteric liquid crystals in a long axis of the second cholesteric liquid crystal molecules, and wherein n4 denotes a refractive index of the second cholesteric liquid crystals in a short axis of the second cholesteric liquid crystal molecules.

In an embodiment, since the second cholesteric liquid crystal layers have the second pitch corresponding to the wavelength of the green light and are configured according to directors arranged in a spiral arrangement with a right circular pitch, the second semi-transmissive film 122 may reflect only the right-circularly polarized green light component GR of the third light L3.

The third semi-transmissive film 123 may reflect a left-circularly polarized blue light component or a right-circularly polarized blue light component the third light L3. In an embodiment, the third semi-transmissive film 123 may reflect the right-circularly polarized blue light component BR of the third light L3. Thus, the third semi-transmissive film 123 may transmit a linearly-polarized light component, the left-circularly polarized light component, and the right-circularly polarized non-blue light component of the third light L3.

The third semi-transmissive film 123 may include third cholesteric liquid crystal layers (or third-group cholesteric liquid crystal layers analogous to the first-group cholesteric liquid crystal layers illustrated in FIG. 4). The third cholesteric liquid crystal layers may include third cholesteric liquid crystal molecules (or third-group cholesteric liquid crystal molecules) and chiral dopants (not shown) configured to align the third cholesteric liquid crystal molecules in specific directions.

In an embodiment, analogous to the first cholesteric liquid crystal layers, the third cholesteric liquid crystal layers may be represented by directors arranged in a spiral configuration with a right circular pitch. The alignment structure of the third cholesteric liquid crystal molecules may be substantially identical to or analogous to those of the first cholesteric liquid crystal molecules and second cholesteric liquid crystal molecules except for a third pitch of the third cholesteric liquid crystal layers in the second direction D2. The third pitch indicates an interval in which the alignment of the third cholesteric liquid crystal molecules is repeated in the second direction D2.

The third pitch may be configured for reflecting a blue light. In an embodiment, the third pitch may correspond to (e.g., be equal to) a wavelength of the blue light. In an embodiment, since a spectrum of the blue light has a peak located at about 480 nm, the third pitch may be about 480 nm.

In an embodiment, the third pitch may be larger than about 480 nm divided by n5, i.e., (480 nm/n5), and may be smaller than about 480 nm divided by n6, i.e., (480 nm/n6), wherein n5" denotes a refractive index of the third cholesteric liquid crystals in a long axis of the third cholesteric liquid crystal molecules of the third cholesteric liquid crystal, and wherein n6 denotes a refractive index of the third cholesteric liquid crystals in a short axis of the third cholesteric liquid crystal molecules.

In an embodiment, since the third cholesteric liquid crystal layers have the third pitch corresponding to the wavelength of the blue light and are configured according to directors arranged in a spiral arrangement with a right circular pitch, the third semi-transmissive film 123 may reflect only the right-circularly polarized light blue component BR of the third light L3.

The first cholesteric liquid crystal layers have a first layer thickness, the second cholesteric liquid crystal layers have a second layer thickness, and the third cholesteric liquid crystal layers have a third layer thickness. The first, second, and third layer thicknesses may be different from each other.

The first semi-transmissive film 121 has a first film thickness, the second semi-transmissive film 122 has a second film thickness, and the third semi-transmissive film 123 has a third film thickness. The first, second, and third film thicknesses may be different from each other.

A reflectance of the first semi-transmissive film 121 with respect to the red light may be referred to as a first reflectance and may depend on the first layer thickness and/or the first film thickness. If the first layer thickness or the first film thickness is configured thicker, the first reflectance may be higher.

A reflectance of the second semi-transmissive film 122 with respect to the green light may be referred to as a second reflectance and may depend on the second layer thickness and/or the second film thickness. If the second layer thickness or the second film thickness is configured thicker, the second reflectance may be higher.

A reflectance of the third semi-transmissive film 123 with respect to the blue light may be referred to as a third reflectance and may depend on the third layer thickness and/or the third film thickness. If the third layer thickness or the third film thickness is configured thicker, the third reflectance may be higher.

The first to third layer thicknesses and/or the first to third film thicknesses may be configured to enable the optical film 100 to reflect a while color. Thus, if the third light L3 is a white light and if the reflected fourth light L4 is received by a user, the user recognizes the white color and does not recognize a different color. In an embodiment, the first, second, and third layer thicknesses and/or the first, second, and third film thicknesses may be configured such that the first reflectance, second reflectance, and third reflectance may have substantially the same value. Therefore, when a white light is irradiated onto the optical film 100, the optical film 100 reflects a red light, a green light, and a blue light with a substantially equal amount, such that a white light may be perceived by the user.

Figure 5:
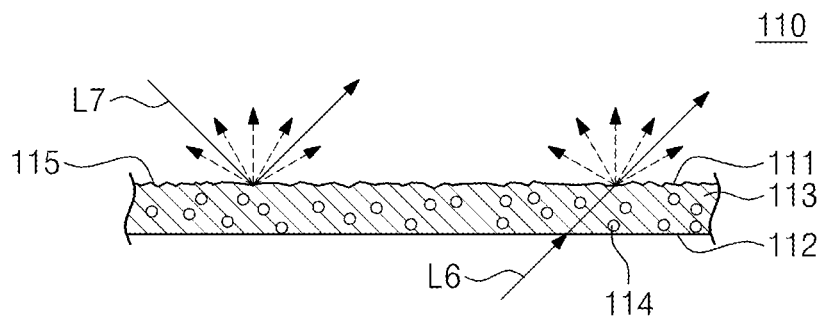
FIG. 5 is a cross-sectional view illustrating an anti-glare film illustrated in FIG. 1.

FIG. 5 is a cross-sectional view illustrating the anti-glare film 110 illustrated in FIG. 1.

Referring to FIG. 5, the anti-glare film 110 may scatter light incident to the anti-glare film 110. The anti-glare film 110 may include a first surface 111 and a second surface 112 opposite the first surface 111. A sixth light L6 incident to the second surface 112 and passing through the anti-glare film 110 may be scattered by the anti-glare film 110. A seventh light L7 incident to the first surface 111 may be substantially irregularly reflected and/or scattered by the anti-glare film.

The anti-glare film 110 includes a resin 113 and light-scattering particles 114 (or scattering particles 114) scattered in the resin 113. The resin 113 may include an acrylate-based resin, e.g., an ultraviolet ray-curable resin. The scattering particles 114 may scatter the sixth light L6 and may scatter the seventh light L7. Each of the scattering particles 114 may have a diameter of one or more micrometers and may be (or may include) a silica-based particle.

The first surface 111 includes concavo-convex portions 115 formed on the entire first surface 111. The concavo-convex portions 115 may substantially irregularly reflect and/or scatter at least a portion of the sixth light L6 and/or at least a portion of the seventh light L7.

Figure 6:
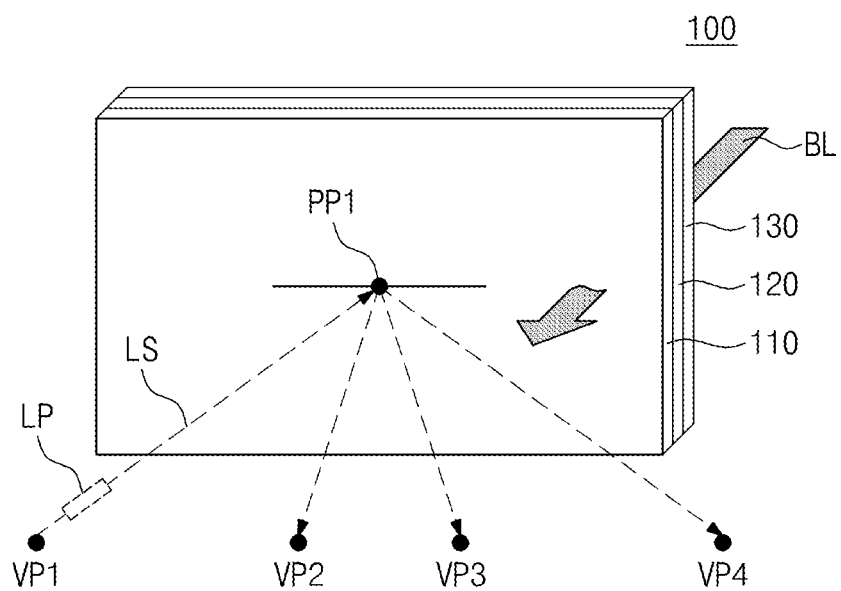
FIG. 6 is a perspective view illustrating that a laser pointer applies light to the optical film illustrated in FIG. 1.

FIG. 6 is a perspective view illustrating that a laser pointer applies light to the optical film illustrated in FIG. 1.

The optical film 100 includes the polarizing plate 130, the semi-transmissive film 120, and the anti-glare film 110, which are sequentially stacked. The optical film 100 may provide satisfactory image visibility against the light provided by a laser pointer.

Referring to FIG. 6, examples of arbitrary positions in the front of the optical film 110 are referred to as first to fourth positions VP1 to VP4, and an arbitrary pointed position on the optical film 100 is referred to as a first pointed position PP1. The user may recognize a laser beam LS at various positions, including the first to fourth positions VP1 to VP4, when the laser beam LS is irradiated onto the first pointed position PP1 by a laser pointer LP.

In an embodiment, since the left-circularly polarized light component or the right-circularly polarized light component of the laser beam LS is reflected by the semi-transmissive films 120, the optical film 100 may reflect a substantial portion of the laser beam LS. The reflected portion of the laser beam LS is scattered in various directions by the anti-glare film 110, and thus the user may recognize the laser beam LS at various positions, including the first to fourth positions VP1 to VP4, in the front of the optical film 100.

An object may be disposed at a rear side of the optical film 100. The light incident to the object may be reflected by the object and may become a background image BL, and the background image BL may be recognized by the user through the optical film 100.

The user may effectively recognize the background image BL at various positions, including the first to fourth positions VP1 to VP4. Since the background image BL is linearly polarized by the polarizing plate 130, the background image BL is not substantially reflected by the semi-transmissive films 120. Accordingly, the user may clearly recognize the background image BL.

As described above, the optical film 100 may provide substantial reflectance of the laser beam LS incident to the front surface of the optical film 100 and may minimize reflection of the background image BL incident to the rear surface of the optical film 100. Advantageously, satisfactory visibility of both the first pointed position PP1 (indicated by the laser pointer LP) and the background image BL may be provided.

Figure 7:
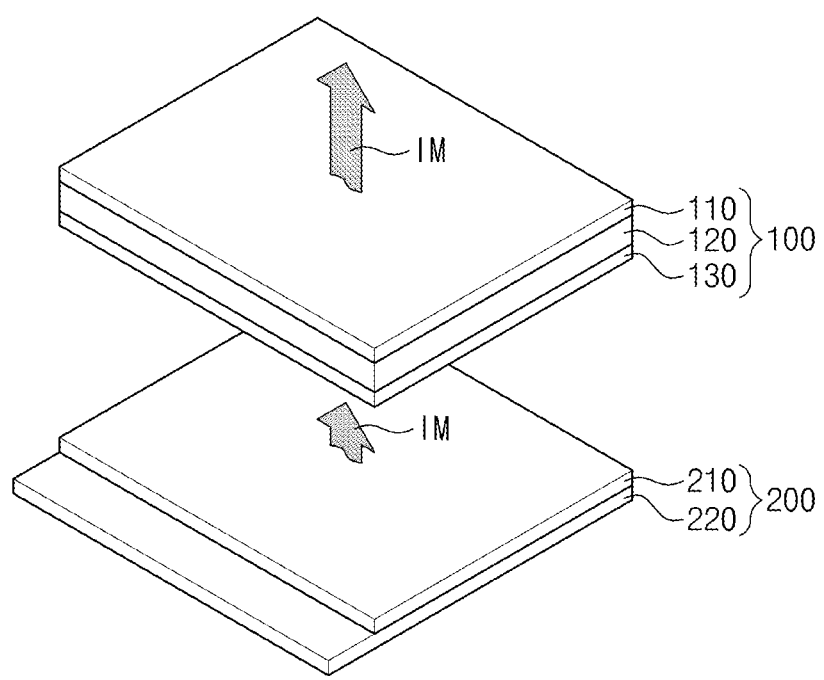
FIG. 7 is a perspective view illustrating a display apparatus including an optical film according to an embodiment of the present invention.
Figure 8:
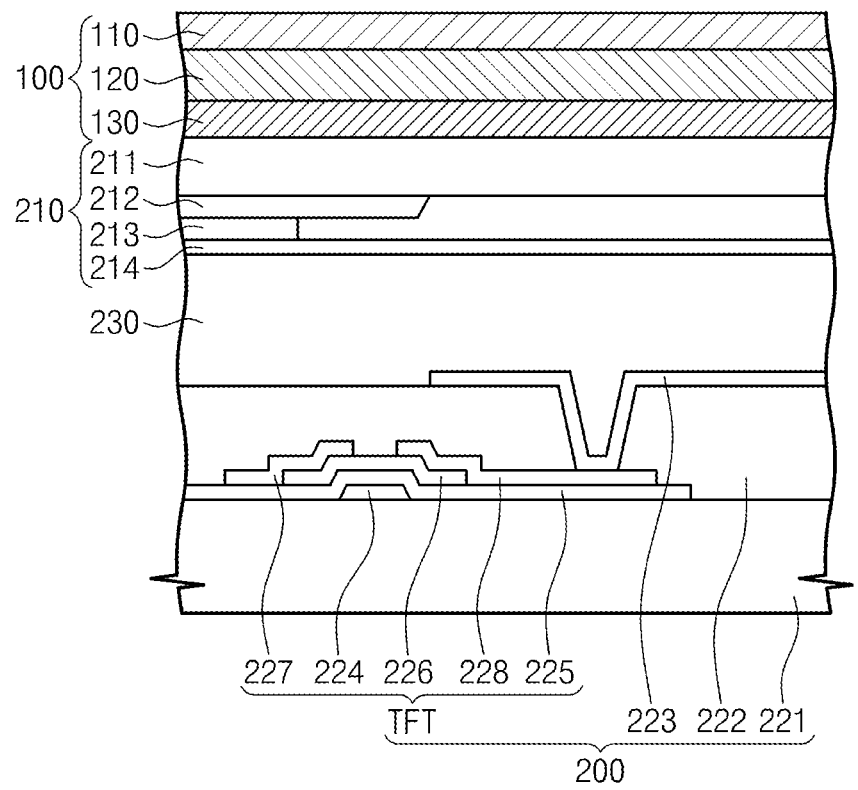
FIG. 8 is a cross-sectional view illustrating the display apparatus illustrated in FIG. 7.

FIG. 7 is a perspective view illustrating a display apparatus 1000 including the optical film 100 according to an embodiment of the present invention. FIG. 8 is a cross-sectional view illustrating the display apparatus 1000 illustrated in FIG. 7.

Referring to FIGS. 7 and 8, the display apparatus 1000 includes the optical film 100 and a display panel 200.

The display panel 200 outputs light including image information IM, which may be substantially transmitted through the optical film 100. The image information IM may be recognized by the user after (being linearly polarized and) passing through the optical film 100.

In an embodiment, the display panel 200 may be a liquid crystal display panel. In an embodiment the display panel 200 may be one of various display panels, such as one of an organic light emitting display panel, a plasma display panel, an electrophoretic display panel, an electrowetting display panel, etc.

The display panel 200 includes an array substrate 220, an opposite substrate 210 overlapping the array substrate 220, and a liquid crystal layer 230 interposed between the array substrate 220 and the opposite substrate 210.

Although not shown in FIG. 7, the display apparatus 1000 may further include a backlight unit configured to provide the light to the rear surface of the display panel 200.

The array substrate 220 includes a first base substrate 221, an insulating layer 222, a thin film transistor TFT, and a pixel electrode 223.

The first base substrate 221 may be an insulating substrate with high transmittance and flexibility. For example, the first base substrate 221 may be or may include one of a glass substrate, a plastic substrate, etc.

The thin film transistor TFT is electrically connected to the pixel electrode 223. Therefore, when the thin film transistor TFT is turned on by a gate signal, a data signal is applied to the pixel electrode 223.

The thin film transistor TFT includes a gate electrode 224, a gate insulating layer 225, a semiconductor layer 226, a source electrode 227, and a drain electrode 228. The semiconductor layer 226 overlaps the gate electrode 224. The gate insulating layer 225 is disposed between the semiconductor layer 226 and the gate electrode 224. The source electrode 227 may contact the semiconductor layer 226. The drain electrode 228 is spaced apart from the source electrode 227 and may contact the semiconductor layer 226.

The pixel electrode 223 is disposed on the insulating layer 222 and may contact the drain electrode 228 through a contact hole formed through the insulating layer 222.

The liquid crystal layer 230 may control transmission and/or intensity of light. The liquid crystal layer 230 includes a plurality of liquid crystal molecules having a dielectric anisotropy.

When an electric field is applied to between the opposite substrate 210 and the array substrate 230, the liquid crystal molecules may be oriented in a specific direction, and the polarization of the light passing through the liquid crystal molecules may be controlled by the optical anisotropy of the liquid crystal molecules.

The opposite substrate 210 includes a second base substrate 211, a color filter 213, a black matrix 212, and a common electrode 214.

The second base substrate 211 may be an insulating substrate with high transmittance and flexibility. For example, the second base substrate 211 may be or may include one of a glass substrate, a plastic substrate, etc.

The common electrode 214 is disposed on the second base substrate 211, overlaps the array substrate 220, and may form an electric field applied to the liquid crystal layer 200 in cooperation with the pixel electrode 223. The black matrix 212 is disposed on the second base substrate 211, overlaps the thin film transistors TFT, and may block light.

The color filter 213 is disposed on the second base substrate 211 to filter the light exiting from the liquid crystal layer 230 to display a color.

The optical film 100 is disposed over (or on) an upper surface of the opposite substrate 210.

The optical film 100 includes the anti-glare film 110, the semi-transmissive films 120, and the polarizing plate 130. The polarizing plate 130, the semi-transmissive films 120, and the anti-glare film 110 are sequentially stacked. In an embodiment, the semi-transmissive films 120 are disposed over the polarizing plate 130, and the anti-glare film 110 is disposed over the semi-transmissive films 120.

The anti-glare film 110, the semi-transmissive films 120, and the polarizing plate 130 may have one or more of the features described with reference to FIGS. 1 to 6.

Figure 9:
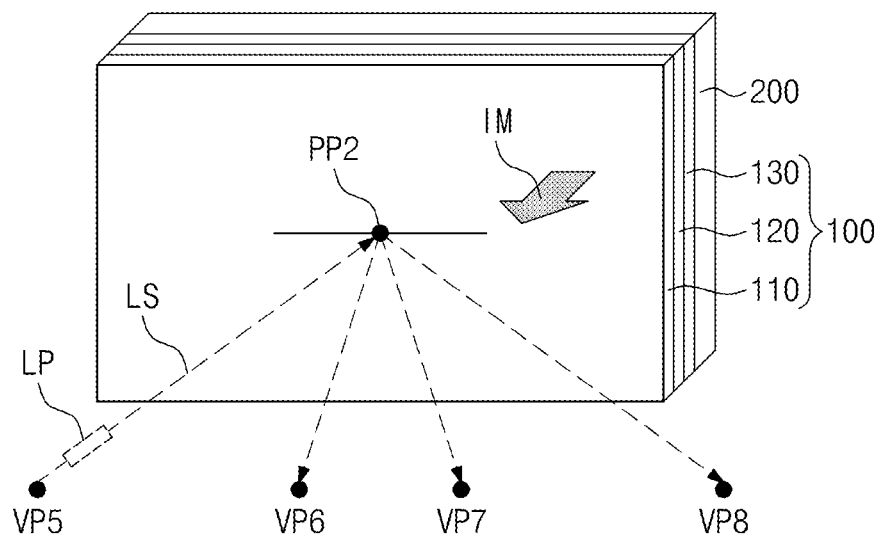
FIG. 9 is a perspective view illustrating that a laser pointer applies light to the display apparatus illustrated in FIG. 7.

FIG. 9 is a perspective view illustrating a laser pointer applied to the display apparatus 1000 illustrated in FIG. 7.

The display apparatus 1000 includes the optical film 100. The display apparatus 1000 may provide satisfactory image visibility against the light provided by a laser pointer.

Referring to FIG. 9, examples of arbitrary positions in the front of the display apparatus 1000 are referred to as fifth to eighth positions VP5 to VP8, and an arbitrary pointed position on the display apparatus 1000 is referred to as a second pointed position PP2. The user may recognize the laser beam LS at various positions, including the fifth to eighth positions VP5 to VP8, when the laser beam LS is irradiated onto the second pointed position PP2 by the laser pointer LP.

In an embodiment, since the left-circularly polarized light component or the right-circularly polarized light component of the laser beam LS is reflected by the semi-transmissive films 120, the optical film 100 may reflect a substantial portion of the laser beam LS. The reflected portion of the laser beam LS is scattered in various directions by the anti-glare film 110, and thus the user may recognize the laser beam LS at various positions, including the fifth to eighth positions VP5 to VP8, in the front of the display apparatus 1000.

In addition, the user may effectively recognize the image information IM at various positions, including the fifth to eighth positions VP5 to VP8. The image information IM is formed by the light exiting from the display panel 200 and transmitted through the optical film 100. The image information IM is linearly polarized by the polarizing plate 130 and not substantially reflected by the semi-transmissive films 120. Accordingly, the user may clearly recognize the image information IM.

As described above, the optical film 100 may provide substantial reflectance of the laser beam LS incident to the front surface of the optical film 100 (i.e., the front surface of the display apparatus 1000) and may minimize reflection of the information image IM incident to the rear surface of the optical film 100. Advantageously, satisfactory visibility of both the second pointed position PP2 (indicated by the laser pointer LP) and the information image IM may be provided.

The optical film 100 may reflect white light without displaying colors in the reflected light. Unwanted colors in the reflected light may be prevented.

Although embodiments of the present invention have been described, it is understood that the present invention should not be limited to these embodiments. Various changes and modifications can be made by one ordinary skilled in the art within the spirit and scope of the present invention.

What is claimed is:

1. An optical film comprising:
a polarizer configured to linearly polarize a first light to provide a linearly polarized light component;
a first semi-transmissive film on the polarizer, configured to transmit the linearly polarized light component, and configured to reflect a first circularly polarized component of a second light, the first circularly polarized component of the second light having a first wavelength; and
a second semi-transmissive film on the first semi-transmissive film, configured to transmit the linearly polarized light component, and configured to reflect a second circularly polarized component of the second light, the second circularly polarized component of the second light having a second wavelength that is unequal to the first wavelength,
wherein the first semi-transmissive film is disposed on the polarizer.

2. The optical film of claim 1, wherein the first semi-transmissive film comprises a first cholesteric liquid crystal layer, and wherein the first cholesteric liquid crystal layer has a first pitch in a direction that is perpendicular to a surface of the optical film, and
wherein the second semi-transmissive film comprises a second cholesteric liquid crystal layer, wherein the second cholesteric liquid crystal layer has a second pitch in the direction perpendicular to the first surface of the optical film, and wherein the second pitch is unequal to the first pitch.

3. The optical film of claim 2, further comprising: a third semi-transmissive film overlapping the second semi-transmissive film, configured to transmit the linearly polarized light component, and configured to reflect a third circularly polarized component of the second light, the third circularly polarized component of the second light having a third wavelength that is unequal to the first and second wavelength.

4. The optical film of claim 3, wherein the third semi-transmissive film comprises a third cholesteric liquid crystal layer, wherein the third cholesteric liquid crystal layer has a third pitch in the direction perpendicular to the first surface of the optical film, and wherein the third pitch is unequal to the first and second pitch.

5. The optical film of claim 4, wherein the first pitch is greater than a first value and smaller than a second value, wherein the first value is calculated from dividing the first wavelength by a refractive index of a liquid crystal molecule of the first cholesteric liquid crystal layer in a long axis of the liquid crystal molecule, and wherein the second value is calculated from dividing the first wavelength by a refractive index of the liquid crystal molecule in a short axis of the liquid crystal molecule, wherein the second pitch is greater than a third value and smaller than a fourth value, wherein the third value is calculated from dividing the second wavelength by a refractive index of a liquid crystal molecule of the second cholesteric liquid crystal layer in a long axis of the liquid crystal molecule, and wherein the fourth value is calculated from dividing the second wavelength by a refractive index of the liquid crystal molecule in a short axis of the liquid crystal molecule, and
wherein the third pitch is greater than a fifth value and smaller than a sixth value, wherein the fifth value is calculated from dividing the third wavelength by a refractive index of a liquid crystal molecule of the third cholesteric liquid crystal layer in a long axis of the liquid crystal molecule, and wherein the sixth value is calculated from dividing the third wavelength by a refractive index of the liquid crystal molecule in a short axis of the liquid crystal molecule.

6. The optical film of claim 5, wherein the first, second, and third wavelength corresponds to a wavelength of red, green, and blue wavelength, respectively.

7. The optical film of claim 6, wherein the first semi-transmissive film has a first reflectance with respect to a red light, wherein the second semi-transmissive film has a second reflectance with respect to a green light, wherein the third semi-transmissive film has a third reflectance with respect to a blue light, and wherein the first reflectance is equal to each of the second reflectance and the third reflectance.

8. The optical film of claim 3, wherein the second semi-transmissive film and the third semi-transmissive film are disposed between the first semi-transmissive film and the polarizer, and wherein the second semi-transmissive film is disposed between the first semi-transmissive film and the third semi-transmissive film.

9. The optical film of claim 1, further comprising: an anti-glare film that includes concavo-convex portions, wherein the first semi-transmissive film is disposed between the anti-glare film and the polarizer.

10. The optical film of claim 1, wherein the polarizer comprises a polarizing film and a protective member that is disposed between the polarizing film and the first semi-transmissive layer.

11. A display apparatus comprising:
a display panel configured to output a first light that is associated with an image;
a polarizer overlapping the display panel and configured to linearly polarize the first light to provide a linearly polarized light component;
a first semi-transmissive film overlapping the polarizer, configured to transmit the linearly polarized light component, and configured to reflect a first circularly polarized component of a second light, the first circularly polarized component of the second light having a first wavelength; and
a second semi-transmissive film overlapping the first semi-transmissive film, configured to transmit the linearly polarized light component, and configured to reflect a second circularly polarized component of the second light, the second circularly polarized component of the second light having a second wavelength that is unequal to the first wavelength,
wherein the polarizer is disposed between the display panel and the first semi-transmissive film.

12. The display apparatus of claim 11, wherein the first semi-transmissive film comprises a first cholesteric liquid crystal layer, and wherein the first cholesteric liquid crystal layer has a first pitch in a direction perpendicular to the first surface of the optical film, and wherein the second semi-transmissive film comprises a second cholesteric liquid crystal layer, wherein the second cholesteric liquid crystal layer has a second pitch in the direction perpendicular to the first surface of the optical film, and wherein the second pitch is unequal to the first pitch.

13. The display apparatus of claim 12, further comprising: a third semi-transmissive film overlapping the second semi-transmissive film, configured to transmit the linearly polarized light component, and configured to reflect a third circularly polarized component of the second light, the third circularly polarized component of the second light having a third wavelength that is unequal to the first and second wavelength.

14. The display apparatus of claim 13, wherein the third semi-transmissive film comprises a third cholesteric liquid crystal layer, wherein the third cholesteric liquid crystal layer has a third pitch in the direction perpendicular to the first surface of the optical film, and wherein the third pitch is unequal to the first and second pitch.

15. The display apparatus of claim 14,
wherein the first pitch is greater than a first value and smaller than a second value, wherein the first value is calculated from dividing the first wavelength by a refractive index of a liquid crystal molecule of the first cholesteric liquid crystal layer in a long axis of the liquid crystal molecule, and wherein the second value is calculated from dividing the first wavelength by a refractive index of the liquid crystal molecule in a short axis of the liquid crystal molecule, wherein the second pitch is greater than a third value and smaller than a fourth value, wherein the third value is calculated from dividing the second wavelength by a refractive index of a liquid crystal molecule of the second cholesteric liquid crystal layer in a long axis of the liquid crystal molecule, and wherein the fourth value is calculated from dividing the second wavelength by a refractive index of the liquid crystal molecule in a short axis of the liquid crystal molecule, and
wherein the third pitch is greater than a fifth value and smaller than a sixth value, wherein the fifth value is calculated from dividing the third wavelength by a refractive index of a liquid crystal molecule of the third cholesteric liquid crystal layer in a long axis of the liquid crystal molecule, and wherein the sixth value is calculated from dividing the third wavelength by a refractive index of the liquid crystal molecule in a short axis of the liquid crystal molecule.

16. The display apparatus of claim 15, wherein the first, second, and third wavelength corresponds to a wavelength of red, green, and blue wavelength, respectively.

17. The display apparatus of claim 16, wherein the first semi-transmissive film has a first reflectance with respect to a red light, wherein the second semi-transmissive film has a second reflectance with respect to a green light, wherein the third semi-transmissive film has a third reflectance with respect to a blue light, and wherein the first reflectance is equal to each of the second reflectance and the third reflectance.

18. The display apparatus of claim 13, wherein the second semi-transmissive film and the third semi-transmissive film are disposed between the first semi-transmissive film and the polarizer, and wherein the second semi-transmissive film is disposed between the first semi-transmissive film and the third semi-transmissive film.

19. The display apparatus of claim 11, further comprising: an anti-glare film that includes concavo-convex portions, wherein the first semi-transmissive film is disposed between the anti-glare film and the polarizer.

20. The display apparatus of claim 11, wherein the polarizer comprises a polarizing film and a protective member that is disposed between the polarizing film and the first semi-transmissive layer.

* * * * *